Nov. 14, 1967 W. C. THEILER 3,351,998
ROTARY CUTTING TOOL
Filed Aug. 13, 1965
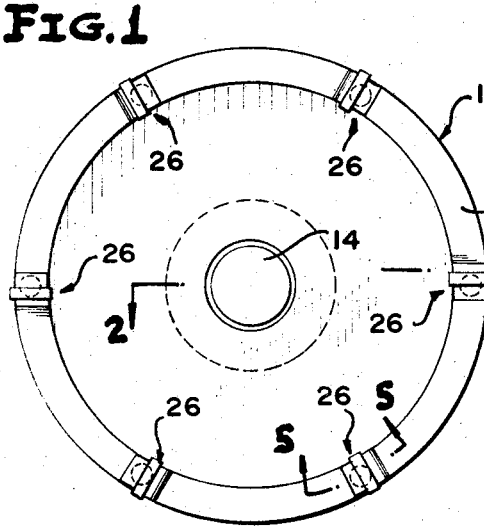
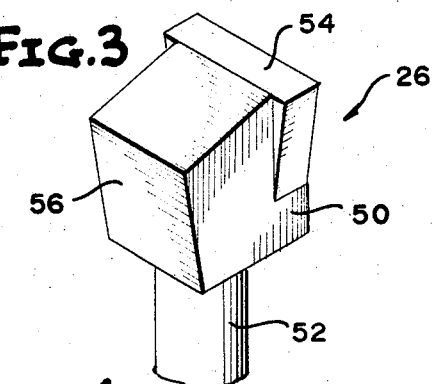
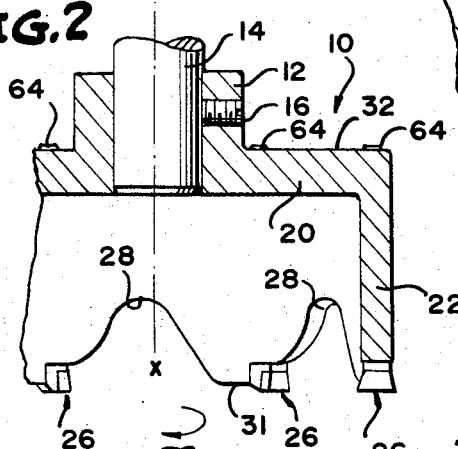
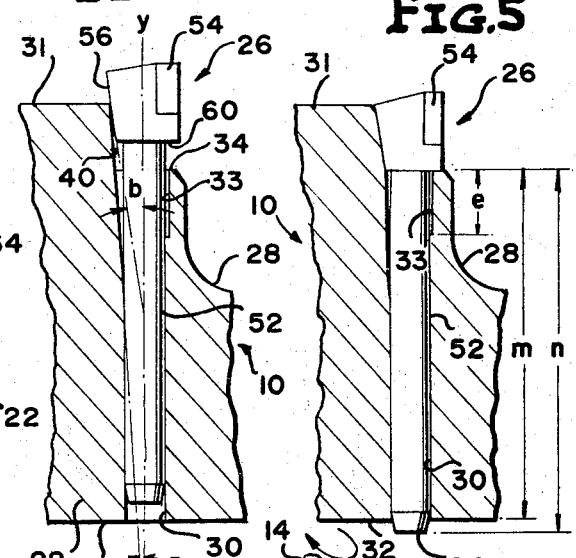
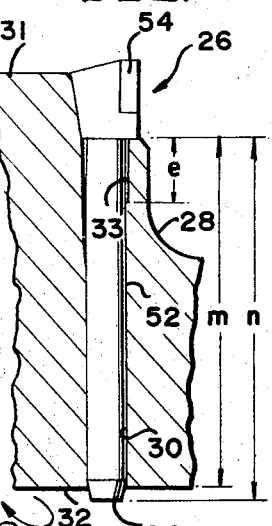
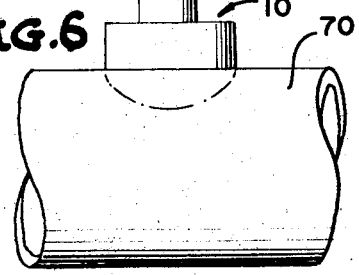
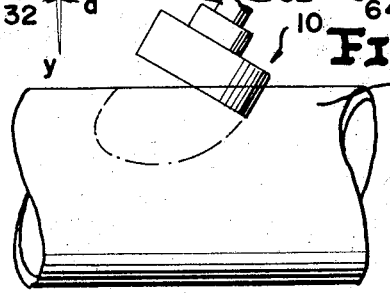
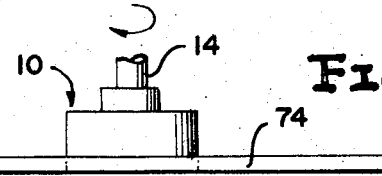
INVENTOR
WERNER C. THEILER
BY *Shoemaker and Mattare*
ATTORNEYS United States Patent Office 3,351,998
Patented Nov. 14, 1967

3,351,998
ROTARY CUTTING TOOL
Werner C. Theiler, Wolf Hill Road, R.F.D. 1,
Huntington, N.Y. 11743
Filed Aug. 13, 1965, Ser. No. 479,462
9 Claims. (Cl. 29—105)

ABSTRACT OF THE DISCLOSURE

A rotary cutter head includes a hub adapted to be connected with a drive shaft and a longitudinally extending annular portion forming a shell. A plurality of tool bits are supported by the shell in spaced relationship thereabout. Each bit is supported within a hole in the shell, each hole extending completely through the shell in a longitudinal direction and being substantially cylindrical in shape. Each hole is of uniform diameter throughout except for an elongated relieved portion of greater cross sectional dimension adjacent a stop surface, this relieved portion extending only a minor portion of the over-all length of the hole and being approximately 20% of such length. The cutter head defines a wedge surface adjacent each hole, each wedge surface forming a small angle on the order of 2° with the longitudinal axis of the hole. Each tool bit includes an enlarged head portion and an elongated substantially cylindrical shank portion fitting snugly within one of such holes. Cutting tips are secured to the enlarged head portion of the bits. Each enlarged head portion has a wedge surface thereon, this wedge surface defining an angle with respect to the longitudinal axis of the shank which is greater than the aforementioned angle, the difference in angularity being slight. The cooperation between these wedge surfaces causes the tool bit to be wedged tightly into operative position. When the tool bit is in operative position, the terminal end of the elongated shank portion of the tool bit extends beyond the rear surface of the cutter head so that it can be struck to force the tool bit out of operative position.

---

The present invention relates to a new and novel rotary cutting tool, and more particularly to a cutting tool adapted to cut circular holes in tubes, pipes and the like.

The cutting tool of the present invention is especially adapted to place circular openings in tubes, pipes and the like to facilitate the joining of such members to one another. This type of cutting operation is generally accomplished by means of cutter heads designed to remove a ring-shaped portion of the tube so as to leave a hole the size of the outer diameter of the ring-shaped portion. These types of rotary cutting tools usually employ cutter heads having carbide tool bits brazed in place thereon.

This type of rotary cutting tool is used in the field and the tool receives heavy abuse in normal handling thereof which requires frequent resharpening of the cutting edges. With certain prior art arrangements, it is necessary to remove the cutting head and return it to the manufacturer for resharpening thereby resulting in time-consuming operations, down time of the machine and substantially increasing the cost of operation.

In order to overcome the disadvantages of such prior art arrangements, efforts have been made to design cutter heads having removable tool bits which can be replaced in the field. Prior art arrangements to accomplish such a purpose have provided arrangements wherein a plurality of parts are required such that the construction is rather costly and toolroom care is required when they are being replaced. This is a disadvantage since the cutting heads are employed by construction personnel with little mechanical skills or specialized training.

The present invention provides a one-piece insert which can be readily replaced in the field thereby eliminating the necessity of returning the cutter head to the factory saving shipping charges and a considerable amount of time. No special tools are required for inserting or removing the tool bits of the present invention, and the tool bits can be replaced without removing the cutter head from the associated machine. Particularly costly are failures of brazed tool cutters occurring due to breakage of tool bits rather than wear. It is of great importance to restore the cutting equipment to operating condition with a minimum of down time.

A special advantage of the present invention is the fact that the tool bits can be replaced in a virtually foolproof manner even by the most unskilled person and the tool bit will be automatically accurately located in position and held in place. The tool bit can also be readily removed simply by knocking it out of position as hereinafter described.

A particular problem in the art has arisen due to the fact that this type of rotary cutting tool employs a cutting head of generally cup-shaped configuration having a relatively thin portion. It is extremely difficult to provide an effective means of mounting a tool bit where the shell thickness is limited as is the case with this type of tool. In the present invention, the tool bits are effectively maintained in position where the shell thickness is not great, and further the tool bit is retained in radial position even when unbalanced side forces are applied thereto.

The utilization of removable tool bits substantially reduces the cost of resharpening the tool since the tool bits can be resharpened without the necessity of providing large holding or indexing equipment. Furthermore, it is not necessary to stock a stand-by cutter head as is necessary where the bits are not removable. In the present invention, it is only necessary to stock extra tool bits which obviously will require less space and which requires less investment.

A further advantage of the present invention is the fact that a single cutter head can be used over and over again without the necessity of buying additional cutter heads, and furthermore it is not necessary to remove a cutter head because of damage to a single cutting bit thereon, since the individual tool bits can be readily replaced.

An object of the present invention is to provide a new and novel rotary cutting tool which is particularly adapted to cut circular holes in tubes, pipes and the like, but which also may obviously be employed for cutting similar holes in flat plates if desired.

Another object of the invention is the provision of a rotary cutting tool having replaceable tool bits which can be readily replaced in the field without removing the cutter head from the machine and without the necessity of providing any special tools.

Still another object of the invention is to provide a rotary cutting tool having removable tool bits which can be replaced in a virtual foolproof manner by unskilled personnel and wherein the tool bits are automatically accurately located in position.

A further object of the invention is the provision of a rotary cutting tool which permits effective mounting of removable tool bits in a cutter head having a relatively thin shell thickness and wherein the tool bits are retained in radial position when unbalanced side forces are applied thereto.

A still further object of the invention is to provide a rotary cutting tool wherein the resharpening operation is simplified and reduced in cost, and further wherein it is not necessary to keep in stock an extra cutter head, the cutter head of the present invention being employed over and over again and wherein it is not necessary to discard a cutter head because of damage to a single cutting bit thereof.

Other objects and many attendant advantages of the invention will become more apparent when considered in connection with the specification and accompanying drawings, wherein:

FIG. 1 is an end view of a rotary cutting tool according to the present invention;

FIG. 2 is a sectional view taken substantially along line 2—2 of FIG. 1 looking in the direction of the arrows;

FIG. 3 is a top perspective view on an enlarged scale of one end portion of a tool bit according to the present invention;

FIG. 4 is a sectional view similar to FIG. 5 and illustrating the tool bit prior to being driven into operative position;

FIG. 5 is a sectional view taken substantially along line 5—5 of FIG. 4 showing a tool bit in operative position;

FIG. 6 is a somewhat schematic view illustrating the manner in which a hole may be cut by the rotary head of the present invention in a tubular member;

FIG. 7 is a schematic view illustrating a further manner of employing the cutting tool of the present invention in a tubular member; and FIG. 8 illustrates the manner in which the cutting tool of the present invention may be employed for cutting a hole in a flat plate.

Referring now to the drawings wherein like reference characters designate similar parts throughout the several views, the cutter head is indicated generally by reference numeral 10, this cutter head being formed of a suitable rigid metallic substance and as seen most clearly in FIG. 2 including a hub portion 12 which is adapted to fit snugly about a drive shaft 14 connected with any suitable driving means, the hub portion being secured on the drive shaft 14 by a set screw or the like 16. The shaft 14 and cutter head are mounted for rotation about an axis $x$—$x$ as seen in FIG. 2.

The cutter head includes a radially outwardly directed portion 20 which is in turn joined with a longitudinally extending annular portion 22 which forms the shell of the cutter head, the shell being of limited thickness in order that the shell may follow the cutting portions of the tool into a ring-shaped portion of material which is cut out of a workpiece. In other words, the thickness of the shell 22 should be less than the cutting edge of the tool bits as hereinafter described.

A plurality of tool bits indicated generally by reference numeral 26 are illustrated as being six in number as seen most clearly in FIG. 1 and substantially equally spaced about the cutter head, each of these tool bits being supported within the shell portion of the cutter head as hereinafter more fully described. As seen in FIG. 2, the shell portion of the cutter head may be cut away as indicated by reference numerals 28 between the removable tool bits.

Referring now particularly to FIG. 4, the means for supporting each of the removable tool bits in operative position within the shell portion of the cutter head includes a plurality of holes 30, it being understood that each of the tool bits is received within one of the holes 30, and the construction of each of the holes 30 and the adjacent portions of the cutter head are identical, as is the construction of each of the tool bits, and accordingly a detailed description of one of the holes and adjacent head structure and a particular tool bit will suffice for describing each of the comparable arrangements.

Each of holes 30 extends completely through the cutter head or a portion thereof from the forward to the rear face thereof, the forward and rear faces being identified by reference numerals 31 and 32 respectively. Each of holes 30 is substantially cylindrical and is symmetrical about an axis $y$—$y$ which extends substantially parallel with the axis of rotation $x$—$x$ of the over-all cutter head as aforedescribed. Each of holes 30 is of uniform diameter throughout except for an elongated relieved portion 33 of greater cross sectional dimension which is disposed adjacent a stop surface 34 defined by the cutter head, this relieved portion extending lengthwise of the hole 30 only a minor portion of the over-all length thereof as will be clear from the drawings, and in fact may extend approximately 20% of the length of the associated hole.

Each of stop surfaces 34 is disposed in a plane extending substantially perpendicular to the axis of rotation of the cutter head, and the cutter head defines a wedge surface 40 adjacent each hole and stop surface formed thereon, the wedge surface 40 extending between the associated stop surface 34 and the forward face of the cutter head. Each of these wedge surfaces 40 formed on the cutter head form an angle $a$ as seen in FIG. 4 with respect to the longitudinal axis $y$—$y$ of the hole 30 in the cutter head. This angle may be quite small and may be on the order of 2°.

The tool bits of the present invention are of such a construction as to include a holder means defining an enlarged head portion 50 and an elongated substantially cylindrical shank portion 52 extending therefrom and adapted to fit snugly within one of the holes 30 in the cutter head. Suitable cutting tip such as a carbide tip 54 are secured to the enlarged head portion 50 as by brazing or the like.

Each of the enlarged head portions of the holder means includes a wedge surface 56. As seen in FIG. 4 wherein the tool bit is illustrated as initially inserted in the hole 30 prior to being driven home, the wedge surface 56 defines an angle $b$ with respect to the longitudinal axis of the shank 52, and in this instance, the longitudinal axis of the shank will correspond with the longitudinal axis $y$—$y$ of hole 30. It will be noted that the angle $b$ is greater than the angle $a$. This calculated difference is slight and of such magnitude that maximum contact area between the two mating wedge surfaces is obtained after the tool holder surfaces 60 are firmly seated against the locating surfaces 34.

After having initially inserted the tool bit in the position shown in FIG. 4, the tool bit may be driven home by utilizing a suitable tool such as a hammer, and FIG. 5 illustrates the tool bit in its final operative position wherein a portion of the undersurface 60 of the enlarged head of the tool bit engages the stop surface 34 to positively limit inward movement of the tool bit into the hole 30.

As the tool bit is driven home to the final operative position shown in FIG. 5, it will be apparent that the wedge surfaces 40 and 56 will cooperate to force the upper part of the shank portion 52 of the tool bit at least partially into the relieved portion 33 such that the tool bit shank portion is slightly bent thereby causing it to be wedged tightly into the operative position shown in FIG. 5. It will be understood that the tool bit holder means may be formed of a suitable material such as steel or the like having the necessary resiliency to permit the tool bit to move into the final operative position shown in FIG. 5.

When in the final operative position shown in FIG. 5, it is apparent that the intercooperation of the inherent resilience of the tool bit along with the interengagement of the wedge surfaces will securely maintain the tool bit in such operative position. The wedge surfaces 40 and 56 will be flush against one another which is of importance to prevent brinelling due to the cutting forces which would result in loosening the interference fit. The elongated shank portion engaging in the hole 30 will prevent any movement of the tool bit radially due to unsymmetric cutting forces that may occur. The angles of the wedge surfaces are such as to assure self-locking between the tool bit and the cutter head and the tolerances of the wedge surfaces guarantee a minimum holding force after the tool bit is inserted in position.

It will be noted as seen in FIG. 5 that when the tool bit is in its operative position, the terminal end 64 of the elongated shank portion 52 of the tool bit extends beyond the rear surface 32 of the cutter head. When it is desired to remove one or more of the tool bits for replacement thereof, it is merely necessary to strike the projecting end portion 64 of the tool bit so as to relieve the wedging forces at the opposite end of the tool bit whereupon the tool bit can be readily removed from its operative position.

As seen particularly in FIG. 5, the length $l$ of the relieved portion 33 of hole 30 is considerably less than the length $m$ of the hole 30 and is a function of the moment of inertia of the shank diameter 52 in order to provide the required cantilever spring force to assure proper wedging. The tolerances of the wedge surfaces are such that there will be interference between the two surfaces when the tool holders 26 are inserted into holes 30. When forced against the locating surface 34, the top part of the tool holder will deflect into the hole elongation. Thus, the problem of extreme accuracy in manufacturing the wedge surfaces in relation to hole and shank is solved. Dimensioning of the holes 30, wedge surfaces 40 and 56 and locating surfaces 60 and 34 is such that after inserting the tool holders, interlocking is assured and at the same time the cutting edges of the carbide inserts are automatically in proper position to provide even tooth loading. Additionally, it will be noted that the length $n$ of the shank portion 52 of the holder means is sufficiently greater than the length $m$ of hole 30 to enable the portion 64 of the shank portion to project beyond the rear surface 32 of the cutter head.

FIGURE 6 illustrates in a somewhat schematic manner the way in which the tool of the present invention as indicated generally by reference numeral 10 may be employed for cutting a generally circular hole in a tubular member 70. FIGURE 7 illustrates the manner in which the cutting tool of the present invention as indicated generally by reference numeral 10 may be inclined at an angle with respect to a tubular member 72 for cutting a hole within the tubular member 72. FIGURE 8 illustrates the manner in which the cutting tool of the present invention as indicated generally by reference numeral 10 may be employed for cutting a large circular hole in a flat plate 74.

It is apparent from the foregoing that there is provided according to the present invention a new and novel rotary cutting tool which is particularly adapted to cut circular holes in tubes, pipes or flat plates and the like. Replaceable tool bits are provided which can be readily replaced in the field without the necessity of sending the cutter head back to the factory thereby saving shipping charges. No special tools are required for inserting or removing the tool bits since it is merely necessary to knock the tool bit into its operative home position and to knock it out of such position when desired. In addition, it is not necessary to remove the cutter head from an associated machine when replacing the tool bits thereby considerably reducing the down time of the machine. Unskilled personnel can readily replace tool bits in a virtually foolproof manner, and the tool bits will be very accurately located in position. The arrangement of the present invention permits effective mounting of removable tool bits in a rotary cutting tool wherein the shell thickness of the cutter head is limited, and the tool bits will be retained in proper radial position when unbalanced side forces are applied thereto. Resharpening of the tool is simplified and the cost reduced since the tool bits do not require large holding or indexing equipment. It is not necessary to stock a stand-by cutter head but only to stock extra tool bits thereby lowering the cost and saving space. The cutter head of the present invention may be used over and over again, and it is not necessary to shut down a machine or remove a cutter head because of damage to a single tool bit.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A rotary cutting tool comprising a cutter head mounted for rotary movement about an axis of rotation, said cutter head having a plurality of holes formed therein and extending substantially parallel with said axis of rotation, said cutter head defining a stop surface adjacent one end of each of said holes, each of said holes having a relieved hole portion of elongated cross section adjacent the associated stop surface, said relieved hole portion extending lengthwise only a minor portion of the length of the associated hole, said body means defining a plurality of wedge surfaces each of which is disposed adjacent one of said stop surfaces, a plurality of tool bits each of which includes a holder means defining an enlarged head portion and an elongated shank, a cutting tip supported on each of said head portions, each of said head portions defining a wdege surface engaging an associated wedge surface on the cutter head for holding the tool bit in operative position, the elongated shank of each of said holder means fitting snugly within an associated hole in the cutter head.

2. Apparatus as defined in claim 1 wherein the shank portion of each of said hole means is of sufficient length to extend outwardly of that portion of the hole opposite to the portion of the hole adjacent said stop surface whereby the tool bit may be readily removed from its operative position in the cutter head.

3. A rotary cutting tool comprising a cutter head mounted for rotary movement about an axis of rotation, said cutter head having a plurality of elongated holes formed therein for receiving tool bits, said cutter head defining a plurality of stop surfaces each of which is disposed adjacent one of said holes, said cutter head defining a plurality of wedge surfaces each of which is disposed adjacent one of said stop surfaces, each of said wedge surfaces defining a particular angle with respect to the longitudinal axis of the adjacent hole, a plurality of tool bits each of which includes holder means having an enlarged head portion and an elongated shank portion, said shank portion of each of said holder means being fitted snugly within one of said holes, the head portion of each holder means when in operative position fitting against one of said stop surfaces, each of said head portions of the holder means having a wedge surface formed thereon, the wedge surface of each of said head portions of the holder means defining an angle with respect to the longitudinal axis of the shank portion thereof which is greater than the first-mentioned angle so that when the tool bit is driven home, the tool bit will be wedged in operative position and retained in such position until removed therefrom.

4. A rotary cutting tool comprising a cutter head mounted for rotary movement about an axis of rotation, said cutter head having a plurality of spaced elongated holes formed therein and extending substantially parallel with said axis of rotation, said cutter head defining a plurality of stop surfaces each of which lies substantially in a plane extending perpendicular to said axis of rotation, each of said stop surfaces being disposed adjacent one end of one of the holes in said body means, each of said holes in the body means including a relieved portion of enlarged cross sectional dimension adjacent the associated stop surface, said relieved hole portions extending longitudinally of the associated hole only a minor portion of the over-all length of the hole, said body means defining a plurality of wedge surfaces each of which is disposed adjacent one of said stop surfaces and which defines a particular angle with respect to the longitudinal axis of the adjacent hole, a plurality of tool bits each of which includes holder means defining an enlarged head portion and an elongated shank portion, the shank portion of each of said holder means fitting snugly within one of said holes in the cutter head, the head portion of each of said holder means including an undersurface portion adapted to engage an associated stop surface on the cutter head, the head portion of each of said holder means defining a wedge surface which forms an angle with respect to the longitudinal axis of the shank portion thereof which is greater than the first-mentioned angle whereby when a tool bit is driven home with the undersurface thereof against a stop surface and with the wedge surface on the head portion of the holder means flush against a wedge surface on the cutter head, the shank of the holder means is disposed at least partially within the relieved hole portion so as to firmly secure the tool bit in operative position.

5. Apparatus as defined in claim 4 wherein the elongated shank portions of each of said holder means are of such a length as to project beyond the open end of each of the associated holes opposite from the open end at one of said stop surfaces whereby the elongated shank can be engaged for driving the tool bits out of operative position when so desired.

6. A rotary cutting tool comprising a cutter head mounted for rotary movement about an axis of rotation, said cutter head having a plurality of spaced holes formed therein for receiving tool bits, said cutter head defining a stop surface adjacent one end of each of said holes, a plurality of tool bits, each of said tool bits including holder means and a cutting tip supported on said holder means, said holder means comprising a head portion and an elongated shank, the elongated shank of each of said holder means being snugly received within one of said holes in the cutter head, the head portion of the holder means being adapted to engage a stop surface on said cutter head, each of said holder means having a wedge surface formed thereon, said body means having a plurality of wedge surfaces each of which cooperates with a wedge surface on one of said holder means for retaining the tool bits in operative position, each of said holes including a relieved portion of elongated dimension adjacent the associated stop surface and extending in a direction away from the adjacent wedge surface.

7. A rotary cutting tool comprising a body means mounted for rotary movement, said body means having a plurality of holes formed therein, a plurality of tool bits each of which includes a cutting tip and a holder means supporting said cutting tip, said holder means each including an elongated shank fitting snugly within one of said holes, each of said holder means including a head portion having a wedge surface formed thereon, said body means having a plurality of wedge surfaces formed thereon each of which directly interengages a wedge surface on one of said holder means for forcing a portion of the shank of said holder means in one direction to retain the tool bits in operative position, each of said holes including a relieved portion adjacent an associated wedge surface and extending away from the adjacent wedge surface for permitting said portion of the shank of the holder means to be forced in said one direction.

8. Apparatus as defined in claim 7 wherein the wedge surfaces on said body means define a particular angle with respect to the longitudinal axis of the adjacent hole, the wedge surface on each of the head portions of said holder means defining an angle with respect to the longitudinal axis of the shank portion thereof which is greater than said first-mentioned angle so that when the tool bit is driven home, the tool bit will be wedged in operative position.

9. A rotary cutting tool comprising a body means mounted for rotary movement, said body means having a plurality of substantially cylindrical holes formed therein, a plurality of tool bits each of which includes a cutting tip and a holder means supporting said cutting tip, said holder means each including an integral elongated substantially cylindrical shank fitting snugly within one of said holes, each of said holder means including an integral head portion having a wedge surface formed thereon, said body means having a plurality of wedge surfaces formed therein each of which directly interengages one of said wedge surfaces on one of said holder means for forcing a portion of the shank of said holder means adjacent said head portion in one direction for retaining the tool bits in operative position, and means for permitting said movement in one direction of said portion of the shank of said holder means.

References Cited

UNITED STATES PATENTS

| | | | |
|---|---|---|---|
| 104,055 | 6/1870 | Munro et al. | 29—105 X |
| 886,515 | 5/1906 | Jude | 29—195 X |
| 1,056,089 | 3/1913 | Conklin | 29—105 X |
| 1,729,050 | 9/1929 | Olson | 29—105 |

FOREIGN PATENTS 347,173   4/1931   Great Britain.

HARRISON L. HINSON, *Primary Examiner.*